June 21, 1955     E. P. BOLENBAUGH     2,711,323
MATERIAL DISTRIBUTING APPARATUS
Filed Sept. 13, 1951     5 Sheets-Sheet 2

Inventor
Elmer P. Bolenbaugh
By Wilfred E. Lawson
Attorney

June 21, 1955  E. P. BOLENBAUGH  2,711,323
MATERIAL DISTRIBUTING APPARATUS
Filed Sept. 13, 1951  5 Sheets-Sheet 3
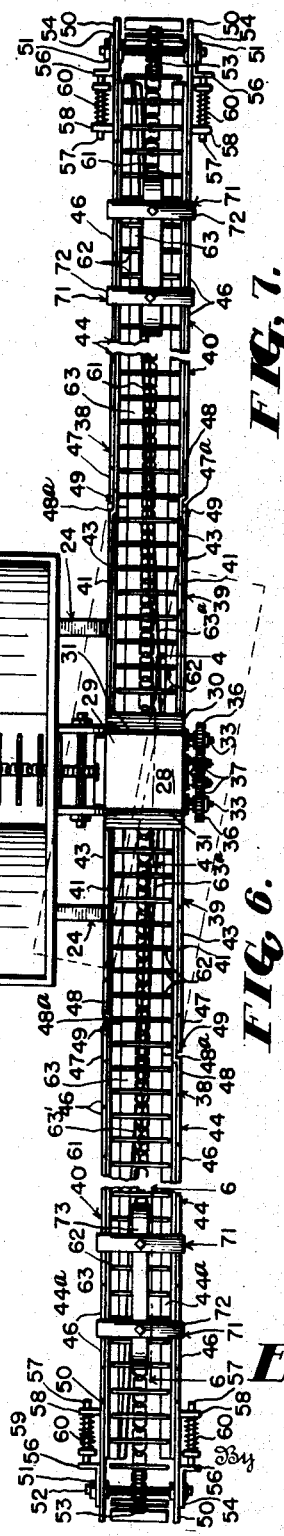
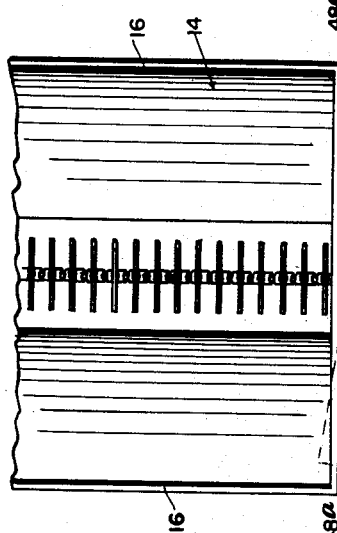
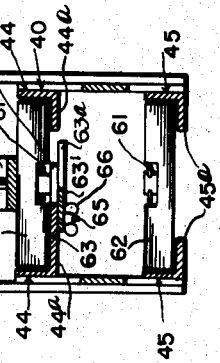
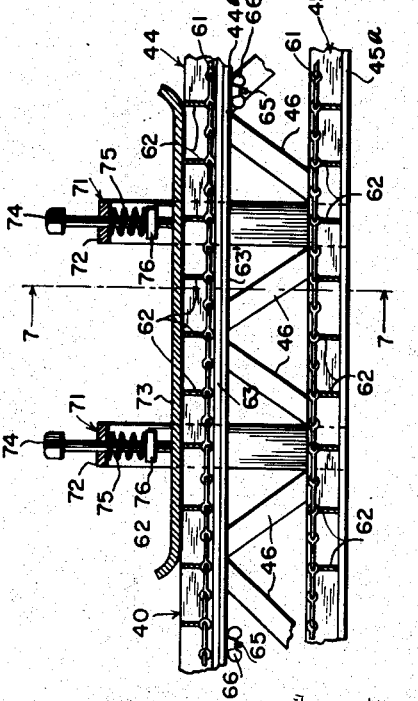
Inventor
*Elmer P. Bolenbaugh*
By *Wilfred E. Lawson*
Attorney

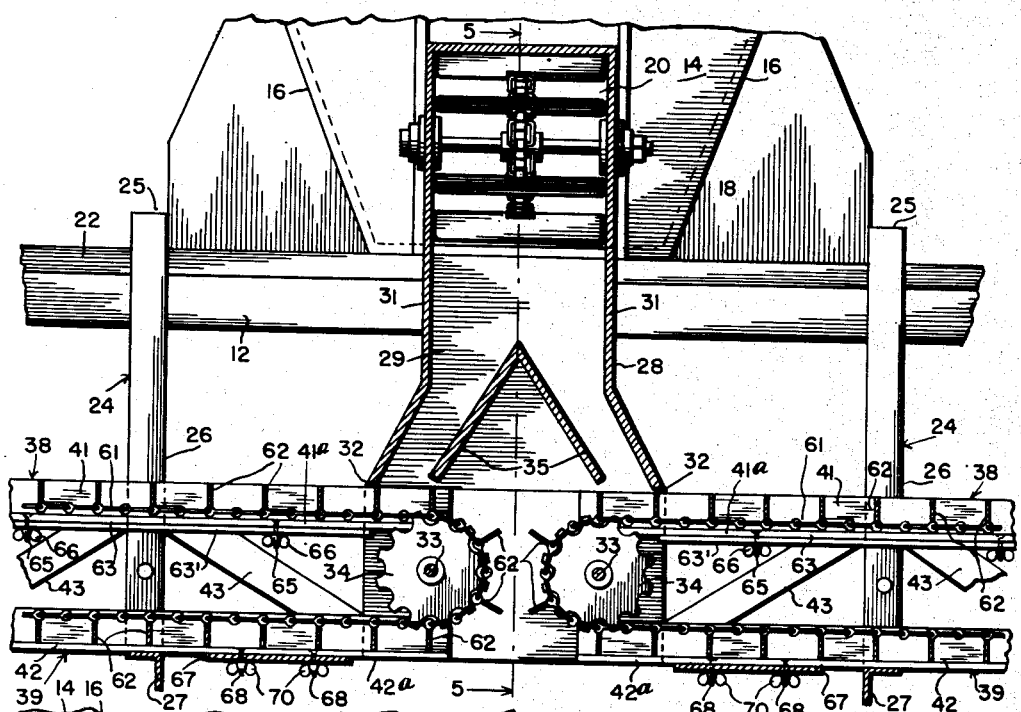

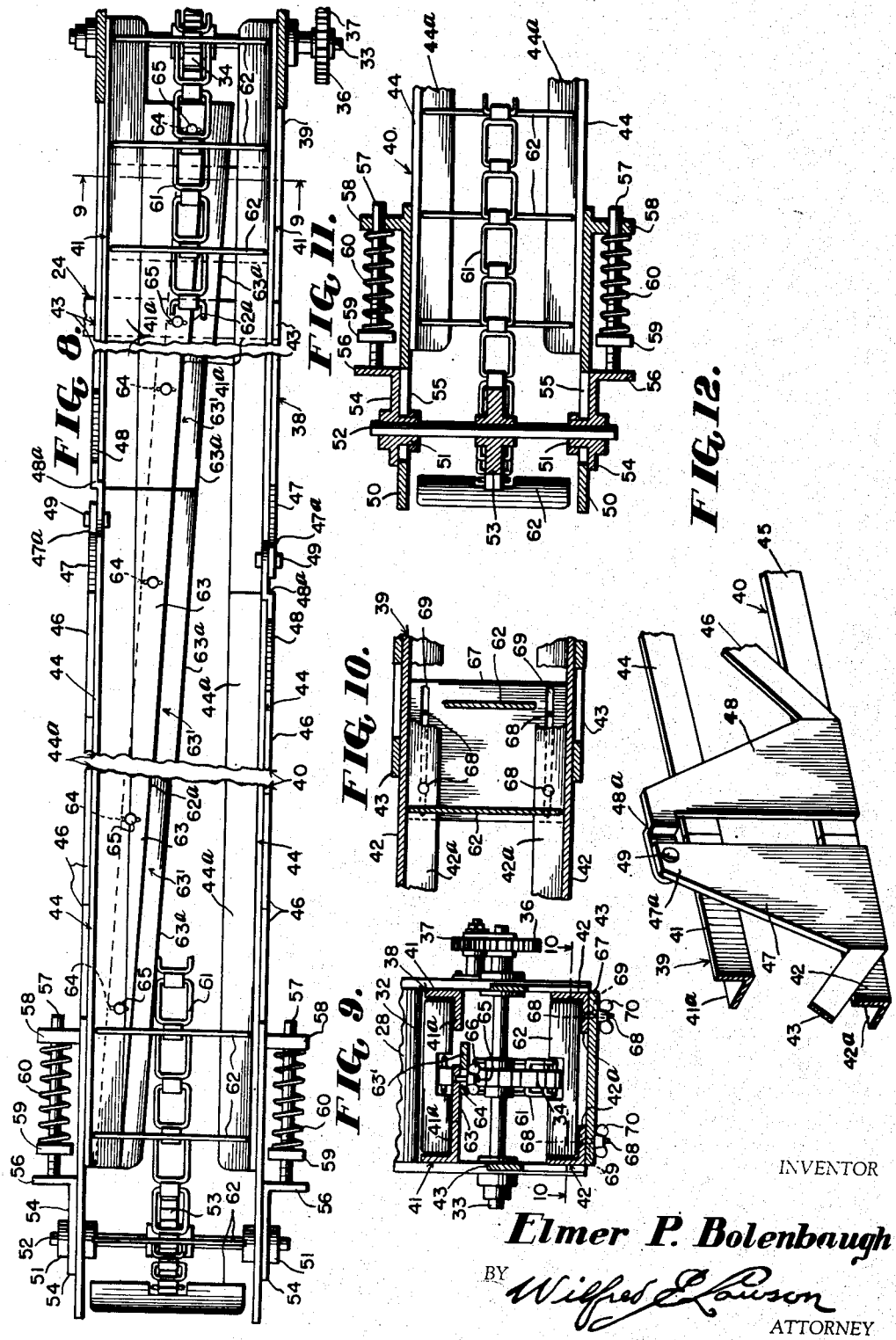

2,711,323

MATERIAL DISTRIBUTING APPARATUS

Elmer P. Bolenbaugh, Forest, Ohio, assignor of one-third to C. E. Van Sickle and one-third to James T. May, both of Delaware, Ohio Application September 13, 1951, Serial No. 246,349

1 Claim. (Cl. 275—2)

This invention relates to the spreading or distribution of ground conditioning material and is directed particularly to an improved apparatus for spreading or distributing lime or other material over a field.

The rotary scattering unloaders of the type at present employed for distributing lime, fertilizer or other material have a number of objectionable features which are that if the apparatus is not maintained horizontal the distance reached by the ejected material is greater on one side of the conveyor than on the other and in addition since materials such as lime and the like are made up of particles of varying sizes the finer material is thrown upward to form a cloud of dust which is often carried to places where it is not wanted and the coarser particles when distributed by the rotary type of spreader are thrown farther than the finer particles thereby creating strips across the field so that in some areas the lime does not immediately become available for plant food. Also in the rotary type of distributor where the same is driven from power derived from the rear wheel or power take off shaft of a truck, the rotary speed of the disk varies in direct ratio to the speed of travel of the machine so that the material is correspondingly unevenly distributed.

A particular object of the present invention is to provide a distributor apparatus for attachment to the rear of a truck body in which the lime or other material is carried, which apparatus is so constructed and arranged that the material will be distributed over a wide area at opposite sides of the truck structure and will be deposited evenly and at a constant rate on the ground regardless of the speed of travel of the machine.

Another object of the invention is to provide a distributing apparatus of the character stated which comprises a pair of distributing arms each of which extends to a substantial distance beyond a side of the truck structure upon which the apparatus is mounted and which supports an endless conveyor which functions to move the material outwardly and distribute it evenly rearwardly of the arms as the truck structure moves forwardly.

Another object of the invention is to provide in a distributing apparatus of the character stated a structure which may be readily attached to any type of truck having a body provided with a rear outlet whereby the lime or other material as it is moved through the outlet from the truck body, will be received in a distributor box and directed toward both sides of the truck onto a long table over which it is moved laterally by conveyor carried paddles.

Still another object of the invention is to provide in an apparatus of the above described character, long distributing tables of gradually decreasing width toward the outer ends which facilitates the distribution of the lime or other material as it is wiped over the tables by the conveyor carried paddles, with means connected with the tables for controlling the amount of material held on the table.

Still another object of the invention is to provide in an apparatus of the above described character, a means whereby the material which is carried laterally by the endless conveyor chain carried paddles or fins, must pass through the chains and paddles of a lower run of the conveyor as a result of which the material if damp and lumpy will be thoroughly broken up before it reaches the ground.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 3 is a view in top plan of the apparatus and the rear portion of the truck, portions of the lateral distributing arms being broken out.

Figure 4 is a vertical sectional view on an enlarged scale and in a plane extending longitudinally and centrally of the inner ends of the lateral distributing arms, the plane of section passing through the material receiving box.

Figure 5 is a vertical sectional view taken substantially on the line 5—5 of Figure 4.

Figure 6 is a sectional view taken substantially on the line 6—6 of Figure 3.

Figure 7 is a transverse section taken on the line 7—7 of Figure 6.

Figure 8 is a view in top plan on an enlarged scale of a lateral distributing arm, with portions of the arm broken out.

Figure 9 is a vertical transverse section taken substantially on the line 9—9 of Figure 8.

Figure 10 is a horizontal section taken substantially on the line 10—10 of Figure 9.

Figure 11 is a horizontal section taken substantially on the line 11—11 of Figure 2.

Figure 12 is a detail perspective view of the hinge construction at one side of a lateral distributing arm.

Figure 1:
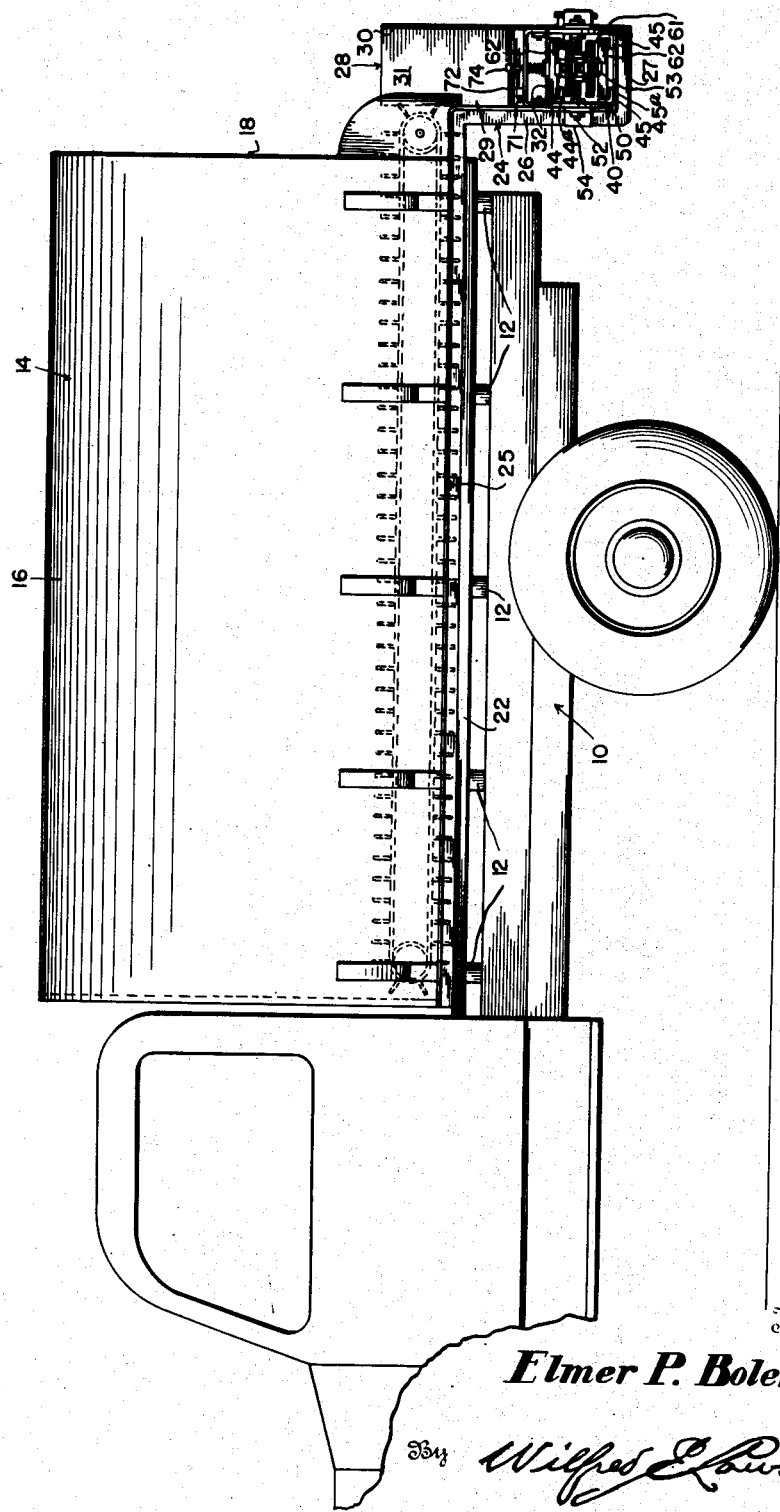
Figure 1 is a view in side elevation of a material distributing truck showing applied to the rear end thereof a lateral distributing mechanism constructed in accordance with the present invention.

Referring now more particularly to the drawings the present material spreader or distributor structure is shown mounted upon and extending transversely of the rear end of a motor vehicle equipped with a suitable power take off to which the hereinafter described rotary elements of the invention are operatively connected.

The vehicle here shown is of conventional construction, comprising the chassis frame generally designated 10 upon which are supported transverse bolsters 12 upon which is mounted the material carrying body receptacle 14 which, as shown, has inclined or downwardly converging side walls 16 and a rear end wall 18 which in this type of body is provided at the bottom with the material outlet opening 20.

Extending lengthwise of each side of the body and supported on the bolsters 12 are running boards 22.

The distributor structure is mounted in a suitable manner across the back of the truck frame. The mounting means here illustrated comprises a pair of substantially Z-shaped hanger brackets each of which is designated 24, wherein one arm, designated 25 is secured horizontally upon a running board or to the bolsters 12 so that the intermediate portion 26 hangs down at the rear of the bed frame and the other arm of the bracket, which is oppositely directed from the arm 25 and is designated 27, projects horizontally rearwardly.

The distributor structure includes a material receiving box which is generally designated 28 and which comprises the forward and rear walls 29 and 30 respectively and the lateral or side walls 31. The top part of the box 28 is of reduced width between the side walls 31 and the box is open at its top and positioned with respect to the truck body discharge opening 20 to receive through the open top the material discharged from the opening 20.

The opposite or lateral sides of the material receiving box have openings 32 from which the hereinafter described endless distributor members or conveyors extend.

Rotatably mounted within the lower part of the distributor box 28 and supported between the front and rear walls are the spaced parallel shafts 33, each of which carries midway between its ends, a sprocket chain gear 34.

Above the shafts 33 and gears 34, within the distributor box, are the downwardly and laterally inclined distributor plates 35 which are joined at their top edges and secured between the front and back walls of the box so that material discharged into the top of the box will be distributed laterally across these distributor boards or plates 35 toward the two lateral openings 32.

Any suitable connection may be made between the shafts 33 and the power take off, not shown, of the truck whereby the sprocket gears 34 will be given the desired opposite rotation. As an illustration, each shaft 33 may be provided with a gear 36 and these gears coupled by the two intermediate gears 37 which are operatively coupled together as shown and one of which receives power from the power take off mechanism of the truck.

Extending laterally from each outlet opening 32 of the distributor box is a two part arm. Each arm is generally designated 38 and is divided into an inner section 39 and an outer section 40. These arms are of duplicate construction.

Each inner section comprises four parallel angle bars arranged to give the arm a rectangular cross sectional form, such angle bars being arranged in an upper pair each of which is designated 41 and a lower pair, each of which is designated 42. The bars of each pair are in horizontally spaced relation, each having a flange directed inwardly toward the inwardly directed flange of the other bar of the pair, and each having its other flange directed vertically as shown in Figure 9. The horizontal inwardly directed flanges of the bars of the top pair are designated 41a and the horizontal inwardly directed flanges of the bars of the lower pair are designated 42a.

The angle bars 41 making up the upper pair each lies above an angle bar 42 making up the lower pair and these vertically spaced bars 41 and 42 are joined and rigidly coupled together by the side plates 43.

As is shown in Figure 5 the angle bars 41 and 42 of each inner arm section extend from the four corners of an opening 32 of a distributor box and overlie and rest upon, and are secured to the adjacent vertical and horizontal portions 26 and 27 of a bracket 24. It will be understood, of course, that the angle bars 41 and 42 are rigidly coupled with the box so that a complete rigid unit is provided which the two bracket arms support.

The outer section or portion 40 of each of the distributor arms 38 is constructed similarly to the inner portion in that it comprises an upper pair of spaced parallel angle bars, each of which bars of the pair is designated 44 and a lower pair of spaced parallel angle bars, each of which bars of the lower pair is designated 45. The angle bars of the upper and lower pairs of the outer arm sections are arranged in the same relation as described in connection with the angle bars 41 and 42 of the inner arm section in that each bar of the upper pair has a flange directed inwardly toward the inwardly directed flange of the adjacent pair as indicated at 44a, with its other flange vertically disposed and each bar 45 of the lower pair also has a flange directed inwardly in opposed relation to the inwardly directed flange of the opposite bar as indicated at 45a, with its other flange vertically disposed as shown.

The outer end of each arm inner section 39 has the ends of the angle bars 41 pivotally coupled to the inner ends of the angle bars 44 of the outer section in the manner about to be described whereby the outer section may be swung upwardly and inwardly and have its opposite or outer end offset with respect to the underlying arm section 39. The offset of one outer arm section 40 with respect to its inner arm section, is opposite to the offset to the other arm outer section so that when such outer sections are raised they will have their free ends disposed in a crossed relation.

The manner of connecting the adjacent ends of the angle bars 41 and 44 of two arm sections to permit this pivoting or upward swinging movement of the outer sections is illustrated particularly in Figure 12.

Figure 2:
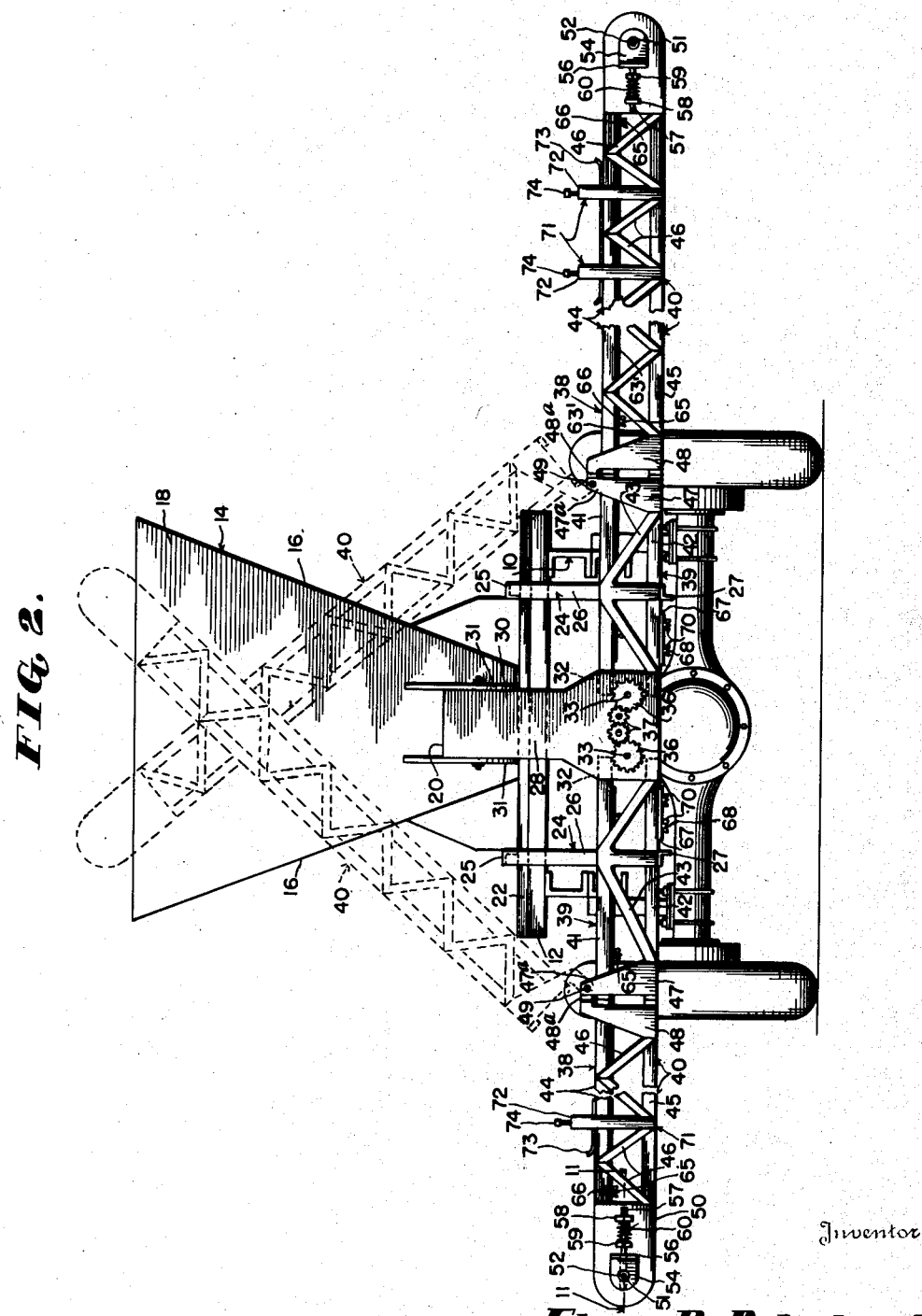
Figure 2 is a view in rear elevation of the same with parts of the lateral material distributing arms broken out.

It will be noted that the angle bars 44 are connected with the underlying angle bars 45 by connecting plates 46 corresponding to the side plates 43 previously described. At the coupled ends of the arm sections these plates are of modified form and become hinge plates which are designated 47 and 48. The outer end of the fixed arm portion 38 carries on one side a plate 47 and on the opposite side a plate 48 while the inner end of the adjacent arm portion 40 carries a plate 47 which coacts with the adjacent plate 48, and a plate 48 on the opposite side which coacts with the adjacent plate 47. As shown each plate 47 has a straight upper end portion which extends above the arm as indicated at 47a while the adjacent plate 48 has an angularly directed leaf 48a which extends lengthwise of the arm and overlaps the end 47a of the adjacent plate 47 and the leaf 48a and the extended end 47a are pivotally coupled by a suitable coupling pin 49 the axis of which is directed transversely of the arm. Thus it will be seen upon reference to Figure 8, that the pivot pins 49 between the ends of the arm portions are parallel but offset from one another in the direction of the length of the arm so that when the outer portion of the arm is swung upwardly its free end will move out of the vertical plane of the fixed inner end portion and by having the pivots properly disposed for the portions of the two arms, the free ends of the outer ends of the arms can be brought into overlapping relation when raised, as illustrated in Figure 2. By this arrangement the arms which extend a substantial distance laterally with respect to the sides of the truck, when the machine is in operation, can be shortened so as to facilitate the movement of the truck and distributor mechanism through gateways, along highways and in other places where the lateral extension of the arms would cause difficulties.

At their outer ends the arm outer portions 40 have the angle bars 44 coupled with the underlying bars 45 by bearing supporting plates 50. These plates 50 carry bearings 51 in which are rotatably mounted the ends of a transverse sprocket gear shaft 52. Upon the shaft 52 between the plates 50 is mounted the sprocket chain gear 53.

Means is provided for adjusting the shaft 52 of each arm, longitudinally of the arm for controlling the tension of the hereinafter described endless chain. While any suitable means may be provided for this purpose, such adjusting means has been here illustrated as comprising the two sliding brackets 54, each of which carries a bearing 51 which is slidably supported in the longitudinal slot 55 in the plate 50.

The bracket 54 includes the laterally extending end portion 56 with which is connected an end of a threaded shank 57, the other end of the shank being freely extended through an opening in a lug 58 which is fixed to the side of the plate 50. Threaded on the shank 57 adjacent to the end portion 56 of the bracket 54 is the adjustment nut 59 and compressed between this nut 59 and the fixed stud 58 is a heavy spring 60. The two springs 60 at the forward and rear sides of each arm constantly urge the bearings 51 and the shaft 52 therebetween outwardly toward the free end of the arm.

Extending lengthwise of each arm and passing around the inner and outer sprocket gears 34 and 53 of each arm is an endless sprocket chain which is generally designated 61. Each of these chains carries a plurality of relatively closely spaced paddles 62 which are of a length to fit loosely between the vertically disposed flanges of the spaced pairs of angle irons and these upper and lower pairs of the angle irons of each arm, and the sprocket gears and sprocket chains, are so adjusted or related that the paddles moving along the top run of the endless chain will have their bottom edges in close proximity to the tops of the horizontal flanges 41a and 44a of the top pairs of angle bars while the paddles which are moving along with the bottom run of each endless chain will have the lowermost longitudinal edges thereof, that is the edges thereof which are remote from the chain, move along the horizontal flanges 42a and 45a of the lowermost pairs of angle bars of the arm sections or parts.

The direction of rotation given to the inner sprocket gears 34 is such that the top runs of the two endless chains will move outwardly from the distributor box toward the free outer ends of the arms.

Extending lengthwise of each distributor arm from the inner end thereof adjacent to the inner sprocket gear 34 to the outer end adjacent to the sprocket gear 53, and disposed directly beneath the top run of the sprocket chain and paddles carried thereby is a feed table 63. This table is fixed in the plane of the horizontal flanges of the angle bars 41 and 44 and is joined to such flanges of those bars which lie on the forward side of the structure or on the side thereof nearest to the front of the machine. This table is of the full width of the space between the opposed flanges 41a and 44a, at the end of the table nearest to the inner sprocket wheels 34 and is of gradually decreasing width toward the outer ends of the arms.

The table for each arm is, of course, in two end opposed sections as is obviously necessary to permit the outer part of each arm to swing with respect to the inner part.

It will be seen from the foregoing that the material which is discharged through the openings 32 of the distributor box from the sloping distributor plates 35 will first fall on the wide inner end of each of the tables and since the paddles 62 of the top run of each endless chain slide along the top surface of the table and since the table is of gradually decreasing width toward the outer end, the material will be fed off evenly from the rear edge of the table as it is carried toward the outer ends of the arms.

The feeding of the material from the edge of the table takes place continuously and simultaneously along the full length of the tables and as the material falls to the ground it passes through the lower run of the endless chain and between the lower paddles which are returning toward the inner ends of the arms and any lumps which may be present due to moisture in the material will be struck by the returning run of the chain and paddles and be broken up. Thus the material will be deposited on the ground evenly and efficiently.

The effective width of the tables is made adjustable to suit the density of the material being spread by the positioning beneath each table of an adjustment plate which is generally designated 63'. This plate is disposed along the tapering rear edge of the table 63 and is provided with a number of transversely directed slots 64 through which extend the downwardly directed threaded studs or screws 65 which are carried by the table and extend downwardly from the lower face thereof and which receive the threaded wing nuts 66.

The tapered edge of the table from which the material is discharged is designated 62a and an edge of the adjustment plate 63 projects rearwardly beyond this edge and can be moved rearwardly therefrom or can be moved or shifted forwardly so as to bring the back edge of the adjustment plate, designated 63a back parallel with the edge 62a of the table.

As the material drops from the table and passes through the lower run of the conveyor chain the chain and the paddles will strike the falling material as stated and kick it inwardly somewhat toward the middle part of the apparatus. In order that the ground may be covered in the area directly beneath the distributor box 28, there is provided beneath the inner ends of the angle bars 42 of each inner part of the arm, a short lower table 67 which is secured to the inwardly directed flanges of the angle bars 42 by threaded bolts 68 carried by the flanges 42a and passing through slots 69 in the plate 67. Wing nuts 70 threaded on the bolts 68 secure the plate 67 in position. This plate 67 is adjustable lengthwise of its supporting arm and catches some of the material dropping from the upper table and such material is swept off toward the center of the apparatus to be deposited on the ground beneath the distributor box. In this manner the material will be evenly distributed over a strip of ground as the truck advances, equal in width to the combined length of the arms when the latter have their outer portions lowered to the horizontal position.

With the present apparatus the presence of uneven ground over which the truck may pass has no effect upon the spreading of the material and, having only a short distance to fall, it will be practically unaffected by wind. Also, since none of the material is thrown upward from the distributor the lighter particles thereof will not be carried by the wind from the desired area.

From the foregoing description it will be readily seen that there is provided by the present invention a distributing apparatus for lime or other materials, which can be readily attached to any type of truck structure having a rear wall outlet and a power take off. Because of the novel manner of delivering the material to longitudinal tables positioned directly beneath the top run of each of the endless chains, both runs of the chains and the paddles carried thereby have a function in effecting the distribution of the material and in breaking up the material where it may be lumpy for the reasons previously stated, so that distribution is more evenly obtained.

In addition to the foregoing, the apparatus can be constructed to cover a wide area by reason of the novel sectional arms, the sections of which are pivoted together in a novel manner whereby when the apparatus is to be moved over roadways, through gates or other narrow places, the outer portions of the arms can be raised to an inoperative position.

In order to prevent the conveyor chains and their paddles from being jerked up from the tables each of the arms carries, substantially midway between its ends, a pair of upstanding frames 71 which are mounted upon the top angle bars 44. Each frame includes a transverse bar 72 and extending lengthwise of the arm and passing beneath these bars 72 are the holddown rails or shoes 73. Bolts 74 are carried by the rails 73 and extend upwardly through openings in the overlying bars 72 and each bolt passes through a coil spring 75 located beneath the bar 72 and presses downwardly on an adjustment nut 76 threaded on the bolt. In this manner the tension of the springs 75 may be adjusted so that the rails 73 are caused to bear lightly against the top edges of the paddles passing therebeneath and sufficiently so only to limit the degree of vibration of the conveyor chains, for instance, to one-eighth of an inch, thus providing that much clearance between the same and the tables. This is a preferred construction for holding down the paddles but any other suitable means may be employed for this purpose.

I claim:

In a material distributing apparatus, a wheeled receptacle for the material having a rearwardly directed outlet, a pair of downwardly directed and laterally divergent discharge chutes, a pair of relatively short arm sections extending laterally in opposite directions from beneath the chutes and spaced from each other at their inner ends, a longer arm section extending in end-to-end relation with respect to the outer end of each of the first arm sections, hinge connections between adjacent ends of said arm sections for the upward and inward swinging of the longer arm sections into positions of non-use, said arm sections being of open frame construction, an endless sprocket chain operatively mounted lengthwise of and within each arm, a sectional table extending lengthwise of and within the sections of each arm directly beneath the top run of the chain therein, each of said tables being tapered along one longitudinal edge to have gradually decreasing width from the inner end to the outer end thereof, a plurality of paddles supported on edge transversely on each chain, the paddles of the top run of each chain having wiping contact along the top surface of each table and being movable in a direction to convey the material along the same away from the associated chute and gradually discharge it therefrom, means for adjusting the degree of taper of said tables, a relatively short table on the under side of each of said first arm sections adjacent the inner ends thereof and disposed directly beneath the paddles on the lower run of the associated chain, whereby material dropping from the upper tables onto the lower ones will be discharged from the inner ends of the lower tables onto the ground area defined by the spacing between the adjacent ends of said first arm sections by wiping action of the paddles on the lower runs of the chains as they pass over the lower tables.

References Cited in the file of this patent

UNITED STATES PATENTS

| | | |
|---|---|---|
| 1,636,883 | Wandscheer | July 26, 1927 |
| 1,854,575 | Baumgardner | Apr. 19, 1932 |
| 2,280,234 | Harvey | Apr. 21, 1942 |
| 2,350,476 | Richey | June 6, 1944 |
| 2,369,755 | Rosselot | Feb. 20, 1945 |
| 2,538,961 | Biszantz et al. | Jan. 23, 1951 |
| 2,577,310 | Connelly | Dec. 4, 1951 |
| 2,583,608 | Smith | Jan. 29, 1952 |